US008050807B2

(12) United States Patent
Varon (10) Patent No.: US 8,050,807 B2
(45) Date of Patent: Nov. 1, 2011

(54) METHODS AND APPARATUS FOR VERTICAL MOTION DETECTOR IN AIR TRAFFIC CONTROL

(75) Inventor: Dan Varon, Needham, MA (US)

(73) Assignee: Raytheon Company, Waltham, MA (US)

( * ) Notice: Subject to any disclaimer, the term of this patent is extended or adjusted under 35 U.S.C. 154(b) by 832 days.

(21) Appl. No.: 12/125,248

(22) Filed: May 22, 2008

(65) Prior Publication Data

US 2009/0326742 A1    Dec. 31, 2009

Related U.S. Application Data

(60) Provisional application No. 60/941,356, filed on Jun. 1, 2007.

(51) Int. Cl.
*G05D 1/08* (2006.01)

(52) U.S. Cl. ............... 701/4; 701/5; 701/207; 701/301; 342/29; 342/455; 340/988

(58) Field of Classification Search .................. 701/4, 5, 701/207, 301; 342/29, 455; 340/988
See application file for complete search history.

(56) References Cited

U.S. PATENT DOCUMENTS

| 6,604,028 B2 | 8/2003 | Varon |
| 2002/0089432 A1 | 7/2002 | Staggs et al. |
| 2003/0060945 A1* | 3/2003 | Varon ............................... 701/4 |

OTHER PUBLICATIONS

Notification Concerning Transmittal of International Preliminary Report on Patentability (Chapter 1 of the Patent Cooperation Treaty), PCT/US2008/064933 mailed Dec. 10, 2009, 2 pages.

Written Opinion of the International Searching Authority, PCT/US2008/064933 mailed Dec. 10, 2009, 7 pages.
Notification of Transmittal of the International Search Report and the Written Opinion of the International Searching Authority, or the Declaration, PCT/US2008/064933 dated Mar. 12, 2009.
Egils Sviestins et al: "Nonlinear Techniques for Mode C Climb/Descent Rate Estimation in ATC Systems", Jan. 1, 2001, IEEE Transactions on Control Systems Technology, IEEE Service Center, New York, NY US, XP011013636, ISSN: 1063-6536, pp. 163-174.
Masayuki Shirakawa: "Altitude Prediction by Natural Spline Tracker", Electronics & Communications in Japan, Part III—Fundamental Electronic Science, Wiley, Hoboken, NJ, US. vol. 78, No. 2, Feb. 1, 1995, pp. 89-100, XP000526410, ISSN: 1042-0967.
Topland M P et al: "Aircraft altitude prediction using mode C measurements" Collection of Technical Papers; 7th AIAA Aviation Technology, Integration, and Operations Conference, vol. 7, Sep. 2007, pp. 860-868, XP009112512.

* cited by examiner

*Primary Examiner* — John Nguyen
*Assistant Examiner* — Jordan Fei
(74) *Attorney, Agent, or Firm* — Daly, Crowley, Mofford & Durkee, LLP (57) ABSTRACT

Methods and apparatus for vertical motion detection of objects, such as aircraft. In one embodiment, a method comprises receiving altitude data for an object, determining a residual of a lag function, wherein the lag function comprises a moving average of the altitude data for the object, and wherein the residual corresponds to a difference between a value for the lag function and the object altitude data at a given time such that the residual grows in magnitude over time in response to the object transitioning from level flight to vertical motion, detecting vertical motion of the object by comparing a sum of data derived from the residuals against a threshold value, and outputting a vertical motion indicator after detecting the vertical motion of the object.

21 Claims, 7 Drawing Sheets

METHODS AND APPARATUS FOR VERTICAL MOTION DETECTOR IN AIR TRAFFIC CONTROL

CROSS-REFERENCE TO RELATED APPLICATIONS

The present invention claims the benefit of U.S. Provisional Patent Application No. 60/941,356, filed on Jun. 1, 2007, which is incorporated herein by reference.

STATEMENT REGARDING FEDERALLY SPONSORED RESEARCH

The Government may have certain rights in the invention pursuant to FAA Contract No. DTFA01-09008.

BACKGROUND

As is known in the art, air traffic control (ATC) systems promote the safe, orderly and expeditious flow of aircraft traffic. Safety is principally a matter of preventing collisions with other aircraft, obstructions, and the ground, assisting aircraft in avoiding hazardous weather, assuring that aircraft do not operate in airspace where operations are prohibited, and assisting aircraft in distress.

As is also known, ATC systems employ information from both ground-based radar and aircraft-based transponders to indicate the horizontal and vertical position of one or more aircraft. Aircraft can include a so-called mode C transponder. The aircraft based Mode C transponder, upon interrogation by an ATC system, transmits information to the ATC about the altitude of the aircraft. The altitude determining method of existing ATC systems uses both Mode C data from the aircraft transponder as well as information from a multi-radar tracker (MRT) process. Data from the Mode C transponder and from the MRT are processed by an altitude post processor (APP) that further enhances the vertical mode of flight (MOF) determination, the determination being that of level or non-level flight.

Existing Mode C data has a resolution of 100 feet, due in part to low resolution of the received Mode C transponder data combined with further limitation of the existing APP processing method. The 100 foot resolution resembles a step function with 100 foot reported altitude jumps as the altitude crosses resolution boundaries. This resolution limit and finite altitude jumps result in both a delay time in the determination of the start or stop of an aircraft altitude change and a relatively high level of uncertainty as to the instantaneous aircraft rate of ascent or decent.

Due to the 100 foot altitude uncertainty, it is necessary to set a minimum limit of 200 feet before an altitude change can be reported by the conventional APPs. It is also necessary to delay altitude change determinations so as to filter out the instantaneous 100 foot uncertainty. Data with this uncertainty is presented to existing Conflict Alert (CA) and Minimum Safe Altitude Warning (MSAW) systems, which are utilized in existing ATC systems. The altitude determination time delay and the altitude uncertainty cause the CA and the (MSAW) systems to miss some real aircraft position conflicts and also to falsely declare some such conflicts. The safety of aircraft monitored by such ATC systems is thereby compromised.

Unlike horizontal motion, which is always non-stationary, vertical motion can be either stationary or non-stationary. Unfortunately, predictor-corrector algorithms, such as Kalman Filters, are incapable of producing precise zero-velocity estimates for stationary targets, for a number of reasons. One is that these algorithms use exponentially-fading historical data, which are slow to respond to fast changes in modes of flight. Another reason is that Mode C data are quantized, exhibiting frequent 100-foot jumps during level flight, instead of constant altitude. The quantization also produces staircase-like behavior during vertical motion, especially at speeds below 500 ft/min.

Because rapid response to changes in mode of flight is critical to the operation of the safety functions, two known methods have been employed to augment the performance of the ATC system tracker. One method retains a received altitude as a reference and then compares it to subsequent measurements. The method assumes level flight as long as subsequent altitudes do not deviate from the reference altitude by more than 200 feet. The reference altitude is reset to the most recent one after 65 seconds or when the 200-ft threshold is exceeded. If the reset occurs simultaneously with a 100-foot quantization jump, it can lead to a 300-ft. delay before vertical motion is declared. Another method employs a tracker-aided statistical analysis to calculate a probability that an aircraft is moving vertically. Non-level flight is declared when the probability exceeds 0.5. The response time of this method is shorter than the former by up to 40 percent.

Although the first method is quite effective at high speeds, its response time diminishes at low speeds because it takes longer to move 200 feet. At 200 ft/min, a 200-ft. move takes 60 seconds. If the data is provided by short-range radar (SRR) with a nominal scan period of 5 seconds, the detection delay would be 12 scans. The second method, though faster, is still not fast enough, according to ARCON Corp., for example, which sent to the Federal Aviation Administration (FAA) two memoranda about this issue. In one memorandum [MO18A-05, Nov. 4, 2005], it compared the warning time obtained after a vertical-motion is reversed from descent to ascent, to that obtained after a transition from level flight to descent, and found that the former was longer. The second memorandum [MO17A-05, Nov. 8, 2005] analyzed the delay encountered in detecting a transition from level flight to a 300-ft/min descent and claimed that the detection delay was longer than it should have been.

SUMMARY

In one aspect of the invention, a method comprises receiving altitude data for an object, determining a residual of a lag function, wherein the lag function comprises a moving average of the altitude data for the object, and wherein the residual corresponds to a difference between a value for the lag function and the object altitude data at a given time such that the residual grows in magnitude over time in response to the object transitioning from level flight to vertical motion, detecting vertical motion of the object by comparing a sum of data derived from the residuals against a threshold value, and outputting a vertical motion indicator after detecting the vertical motion of the object.

The method can further include one or more of the following features: initiating a track of the object in response to the vertical motion indicator, modifying the threshold in response to a change in the sum of the data derived from the residuals, weighting the residuals to generate the data derived from the residuals, smoothing the weighted residuals to generate the data derived from the residuals, smoothing the weighted residuals using a moving sum, computing a modified sum by freezing the sum after an increase, processing the altitude data in an ascent path and a descent path in parallel, limiting to a selected amount of time the altitude data used by the lag function, the residual increases positively for descent vertical motion, the residual decreases in response to the object transitioning to level flight, dividing a range for a value of the residual into a number of bands, and assigning weights to the bands, the altitude information includes Mode C data, the altitude data are separated by a selected amount of time, a change in the direction of vertical motion is detected independently of the vertical motion direction prior to the change in direction, a steady state value of the residual is proportional to a vertical velocity of the object and to a sampling period of the altitude data, and comparing a sum of values from the weighted bands and a threshold value to determine vertical motion.

In another aspect of the invention, a radar system comprises a radar data processor comprising a track processor including a vertical motion detector module to receive altitude data for an object, determine a residual of a lag function, wherein the lag function comprises a moving average of the altitude data for the object, and wherein the residual corresponds to a difference between a value for the lag function and the object altitude data at a given time such that the residual grows in magnitude over time in response to the object transitioning from level flight to vertical motion, detect vertical motion of the object by comparing a sum of data derived from the residuals against a threshold value, and output a vertical motion indicator after detecting the vertical motion of the object.

In a further aspect of the invention, an article comprises a computer readable medium having stored instructions that enable a machine to perform the steps of: receiving altitude data for an object, determining a residual of a lag function, wherein the lag function comprises a moving average of the altitude data for the object, and wherein the residual corresponds to a difference between a value for the lag function and the object altitude data at a given time such that the residual grows in magnitude over time in response to the object transitioning from level flight to vertical motion, detecting vertical motion of the object by comparing a sum of data derived from the residuals against a threshold value, and outputting a vertical motion indicator after detecting the vertical motion of the object.

BRIEF DESCRIPTION OF THE DRAWINGS

The foregoing features of this invention, as well as the invention itself, may be more fully understood from the following description of the drawings in which.

DETAILED DESCRIPTION

Before describing exemplary embodiments of vertical motion detection and air traffic control systems of the present invention some introductory concepts and terminology are explained. The term "maneuver" or "maneuvering" is used herein to describe a flight path or a movement of an aircraft or other target. In particular, a target is "maneuvering" or undergoing a "maneuver" any time the target changes horizontal speed in any dimension. It should be noted that velocity is defined by a speed and a direction. Thus, a target may be maneuvering even when moving along a straight path. The term "mode of flight" (MOF) is used herein to describe a flight path that is either level or non-level. A change in MOF can either be done with or without change in velocity, and with or without a change in horizontal direction. A MOF change indicates a change from level flight to non-level flight, or vice-versa.

It should also be appreciated that exemplary embodiments relate to methods and apparatus for estimating when a moving object's vertical MOF changes between level and non-level. In one exemplary embodiment described herein, the apparatus and techniques process Mode C data having a particular quantization (e.g. Mode C data with 100-ft. quantization). It should be understood, however, that Mode C data with 100-ft. quantization is but one source of data. The apparatus and techniques described herein are not limited to use of Mode C data and they are not limited to any particular quantization value. The examples provided herein are intended to facilitate explanation and understanding of the invention and are not intended to be limiting, It should be understood that the apparatus and techniques described herein can also operate with altitude data having a variety of different quantizations (e.g., 25 ft.) and that such altitude data may be provided from a variety of different sources including but not limited to a GPS source. In still other embodiments, a combination of sources may be used (e.g. both a GPS source and a Mode C source may be used).

Figure 1:
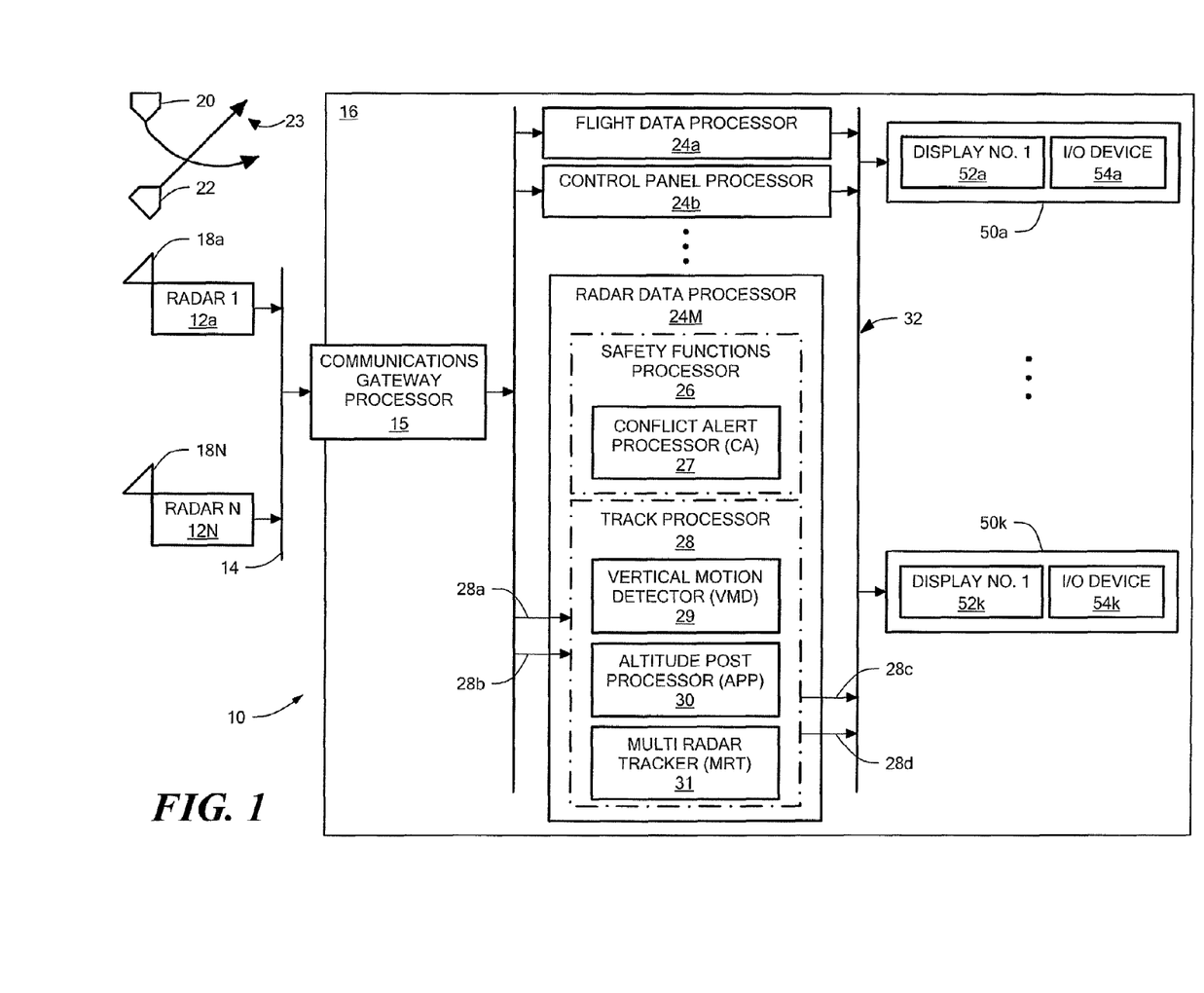
FIG. 1 is a block diagram of an air traffic control system having vertical motion detection.

Referring now to FIG. 1, in general overview, an air traffic control (ATC) system 10 having inventive vertical motion detection is shown to include one or more radar systems 12a-12N generally denoted 12 coupled via a network 14 which may be provided for example, as a local area network, and a communications gateway processor 15 to an air traffic control automation (ATCA) system 16. In the case where multiple radar systems 12 exist, each of the radar systems 12 may be located at different physical locations to provide substantially continuous radar coverage over a geographic area larger than that which could be covered by any single one of the radar systems 12.

In operation, each of the radar systems 12 emits radio frequency (RF) signals into a predetermined spatial region through a corresponding one of antennas 18a-18N as is generally known. Portions of the emitted RF signals intercept targets 20, 22 which may correspond, for example, to aircraft flying in the predetermined spatial region. Those portions of the emitted RF signals which intercept the targets 20, 22 are reflected from the targets 20, 22 as return or target signals which are received by respective ones of the radars 12.

In some cases each of the targets 20, 22 includes a transponder, and the RF signal emitted by the radar system 12 includes an interrogation signal. The interrogation signal interrogates the transponder on the target 20, 22 and in response to an appropriate interrogation signal, the transponder transmits the response signal from the target 20, 22 to the respective radar system 12. Thus, first portions of the return or target signal received by the respective ones of the radars 12 may correspond to portions of the RF signal reflected from the targets 20, 22 and second portions of the target signal can correspond to a response signal emitted from the transponder on the target. The transponder response signal includes Mode C altimeter information, which describes the altitude of the aircraft in digital numerical format.

Each of the one or more radar systems 12 feeds the target data signals through the communications gateway processor 15 to the ATCA system 16. The ATCA system 16 includes one or more processors 24a-24M each of which performs a particular function. Here ATCA system 16 is shown to include a flight data processor 24a for processing flight-plan data submitted by aircraft personnel to designate routes, a control panel processor 24b to provide appropriately processed information to be displayed on one or more displays 52a-52K, and a radar data processor 24M which processes target data signals in a particular manner to be described below. The radar data processor 24M includes a safety functions processor 26 that in turn includes a conflict alert (CA) processor 27. The radar processor 24M also includes a track processor 28 that in turn includes a multi-radar tracker (MRT) 31, a vertical motion detector (VMD) 29, and an altitude post processor (APP) 30.

Those of ordinary skill in the art will appreciate of course that ATCA system 16 may include additional or fewer processors depending upon the particular application. For example, in some embodiments it may be desirable to utilize a single processor that concurrently performs all the functions to be performed by ATCA system 16.

The processors 24 are coupled over a network 32 to the one or more input/output (I/O) systems 50a-50K generally denoted 50. Taking I/O system 50a as representative of systems 50b-50K, each I/O system 50 includes a processor and any other hardware and software necessary to provide a graphical user interface (GUI). Each I/O system includes a display 52a which can have coupled thereto an input device 54a which may be provided, for example, as a keyboard and a pointing device well known to those of ordinary skill in the art, which interfaces with the graphical user interface (GUI) of the display 52a. Those of ordinary skill in the art will appreciate, of course, that other input devices may also be used. The displays 52 may be located at different physical locations.

Among other things, the ATCA system 16 maintains and updates the target data fed thereto to thus maintain the location and speed of targets detected and tracked by the radar system portion of the air traffic control system. In performing this function, the ATCA system typically assigns a unique identifier or "label" to each tracked target.

Air traffic control system 10 generates via the CA processor 27, from time to time, alerts which indicate that one or more targets may become or are physically closer than an allowed minimum separation standard (MSS). If the targets are maneuvering, then in accordance with the present invention, a prediction or determination of whether a violation of the separation standards will occur can be made. The situation where aircraft are maneuvering in proximity may occur at any time during a flight but may occur more commonly around aircraft take-off and landing sites, e.g. airports and terminal radar approach control (TRACON) areas.

Air traffic control system 10 tracks a plurality of targets with two targets 20, 22 here being shown for simplicity and ease of description. The two targets 20, 22 flying in proximity to each other form a target pair 23. At least one of the two aircraft in target pair 23 is maneuvering thereby preventing consistent prediction or determination of a violation of air separation standards. In this case, the processing steps executed by the conflict alert (CA) processor 27 provides a reliable prediction of MSS violations.

The CA processor 27 computes flight paths for the targets 20, 22 and predicts violations of aircraft minimum separation standards (MSS) in cases where the aircraft maneuver dynamics are unknown. The MSS has both a horizontal and a vertical component.

Because the tracking function of conventional ATC systems do not estimate accelerations and turn rates with sufficient accuracy, it is not possible to predict horizontal and vertical conflicts between maneuvering aircraft with the same accuracy as it is for non-maneuvering ones. In an exemplary embodiment of the invention, the tracking accuracy is enhanced by improvements to the track processor 28. Improvements to the track processor will be described in association with subsequent figures.

Generally, random altimeter altitude measurement errors in the Mode C transponder data, compounded by 100 foot quantization resolution in the transponder data transmitted from the aircraft to the radar, can cause the altimeter reports from an actual level fight to toggle between two values which are 100 feet apart. This noisy data results in an inaccurate determination of the aircraft's actual motion. The 100 foot resolution also causes 100 foot reported altitude jumps as the real altitude crosses resolution boundaries. This accuracy limitation and the finite altitude jumps, result in both a delay time in the determination of the start or end of an aircraft altitude change, and a high level of uncertainty as to the instantaneous aircraft rate of ascent or decent.

In accordance with exemplary embodiments of the invention, consider a time series of altitude data $z_n = z(t_n)$, where M is an integer and $t_{n+1} > t_n$. Denote the most recent measurement as $z_N$ and the set of the k most recent measurements as $Z_k = \{z_{N-k+1}, z_{N-k+2}, \ldots z_N\}$. Also define a lag function $L(Z_k)$ that has the following properties:

$$L(Z_k) = z_N \text{ if } z_{N-k+1} = z_{N-k+2} = \ldots = z_N \text{ (level flight)} \quad (1a)$$

$$L(Z_k) \neq z_N \text{ otherwise.} \quad (1b)$$

And define the residual of the lag function as $r_N = L(Z_k) - z_N$. Then it follows that $r_N = 0$ if the flight is level, and $r_N \neq 0$ if not. So, by monitoring the residual after every scan, one can readily determine when a transition from level flight has occurred. In an ideal, noiseless environment, such mathematics are not really needed, because calculation of the difference between consecutive measurements would produce the same result. The deleterious effects of measurement noise and quantization make these mathematics necessary. The residual of non-ideal data is $R_N = r_N + E_N$, where $r_N$ is the data component of the residual and $E_N$ is the noise component. Although these components are separately defined here, they cannot be isolated for live data, but they can be for simulated data, for which the truth is known and $r_N$ can be separately calculated.

The lag function used in an exemplary embodiment of vertical motion detection is the k-element moving average, $$L(Z_k) = \frac{1}{k} \sum_{n=N-k+1}^{N} z_n \quad (2)$$

with $k \leq 9$, where $k = 9$ or the number of measurements received within the last 45 seconds, for example, whichever is smaller. It is envisioned that for each track, a nine-element circular buffer is maintained, in which the last nine pairs of time and altitude $(t_n, z_n)$ are stored. It is understood that any practical number of storage/buffer elements can be used to meet the needs of a particular application. After every update of the buffer, its most recent k altitudes are used to calculate the lag function.

For example, when data is received from a short-range mono-radar with a scan period of 5 seconds or less, the entire buffer is used, unless one or more returns are missing and the buffer spans more than 45 seconds. When data is received from a long-range mono-radar with a scan period of 12 seconds, not more than the last four entries are used. The rationale behind this scheme is to limit the age of data used to not more than a selected amount of time, 45 seconds, for example. On the other hand, in a multi-radar environment, the buffer might span too brief a period, creating residuals that are too small. To avoid this situation, the time difference between consecutive entries in the buffer is limited to not less than 2 seconds, for example. Any measurement that is received within less than 2 seconds is not entered into the buffer. The calculations in Mathematical Derivations and Formulas section below reveal that the data component of the residual steady state is proportional to k, to the aircraft's vertical velocity, and to the sensor's sampling period. It is understood that the parameters used in the above example are not limiting, but rather, intended to provide illustrative values to convey an understanding of exemplary embodiments of the invention.

The transition from level flight to vertical motion causes the data component ($r_N$) of the residual to grow. The growth is positive during descent and negative during ascent. The residual continues to grow as more elements $z_n$, in Eq. (2) deviate from their level-flight values. After k updates, the last remnant of the level-flight data drops out of the sum and the residual reaches steady state. The situation is reversed after a transition from vertical to level-flight. As more elements in the sum become equal to one another, the residual diminishes until its data component becomes equal to zero.

Figure 2:
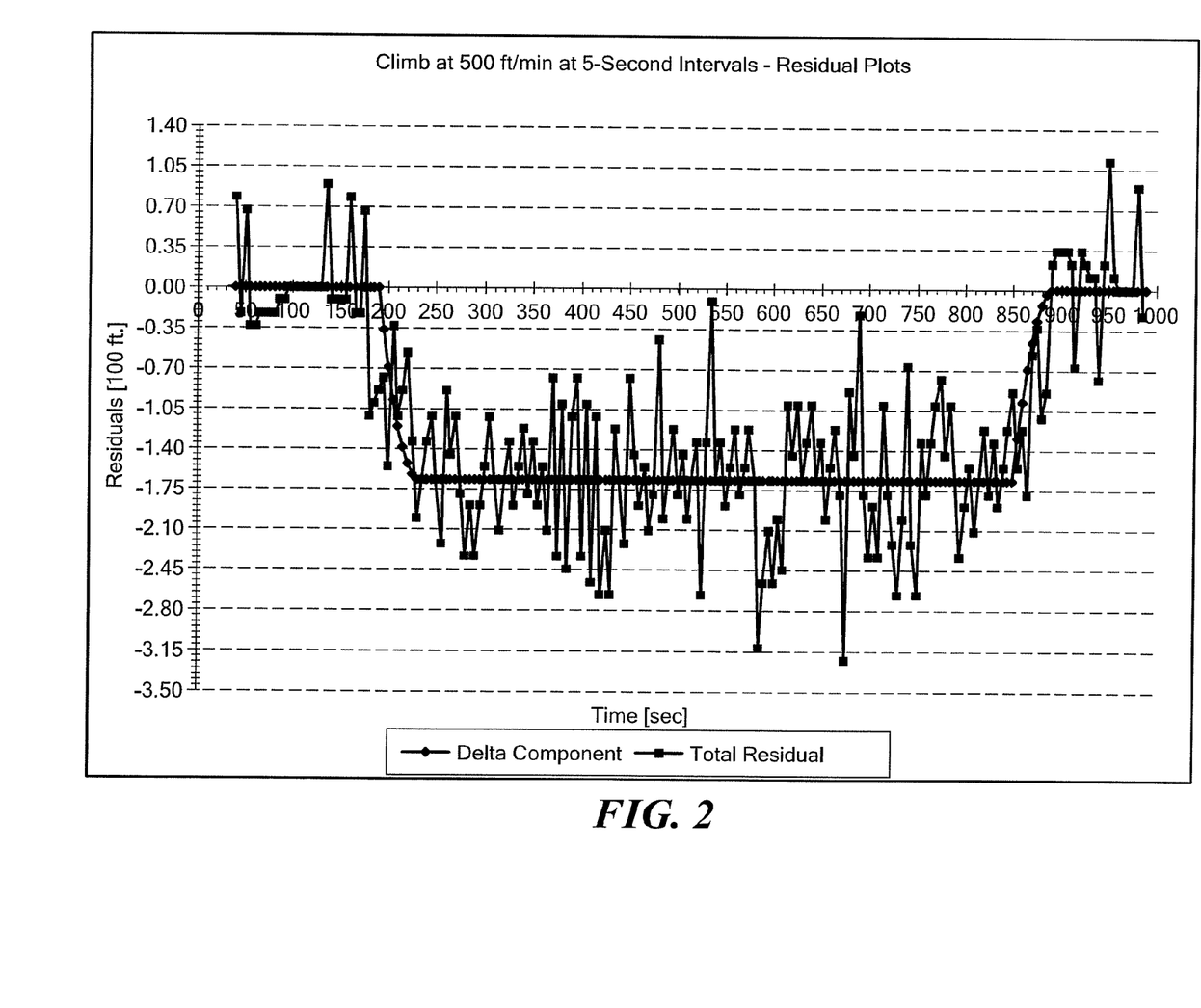
FIG. 2 is a graphical depiction of residual data over time.

FIG. 2 compares the data component and total residual of Eq. (2) for a 500-ft/min climb, using simulated Mode C data at five-second intervals. The measurement noise RMS value is equal to 50 ft. The climb begins at $t_{39}$=190 seconds and ends at $t_{171}$=850 seconds. If the aircraft were descending at −500 ft/min, the total residual would have a data component that is the mirror image, relative to the time axis, of the one depicted in FIG. 2, modulated by a noise component.

Figure 3:
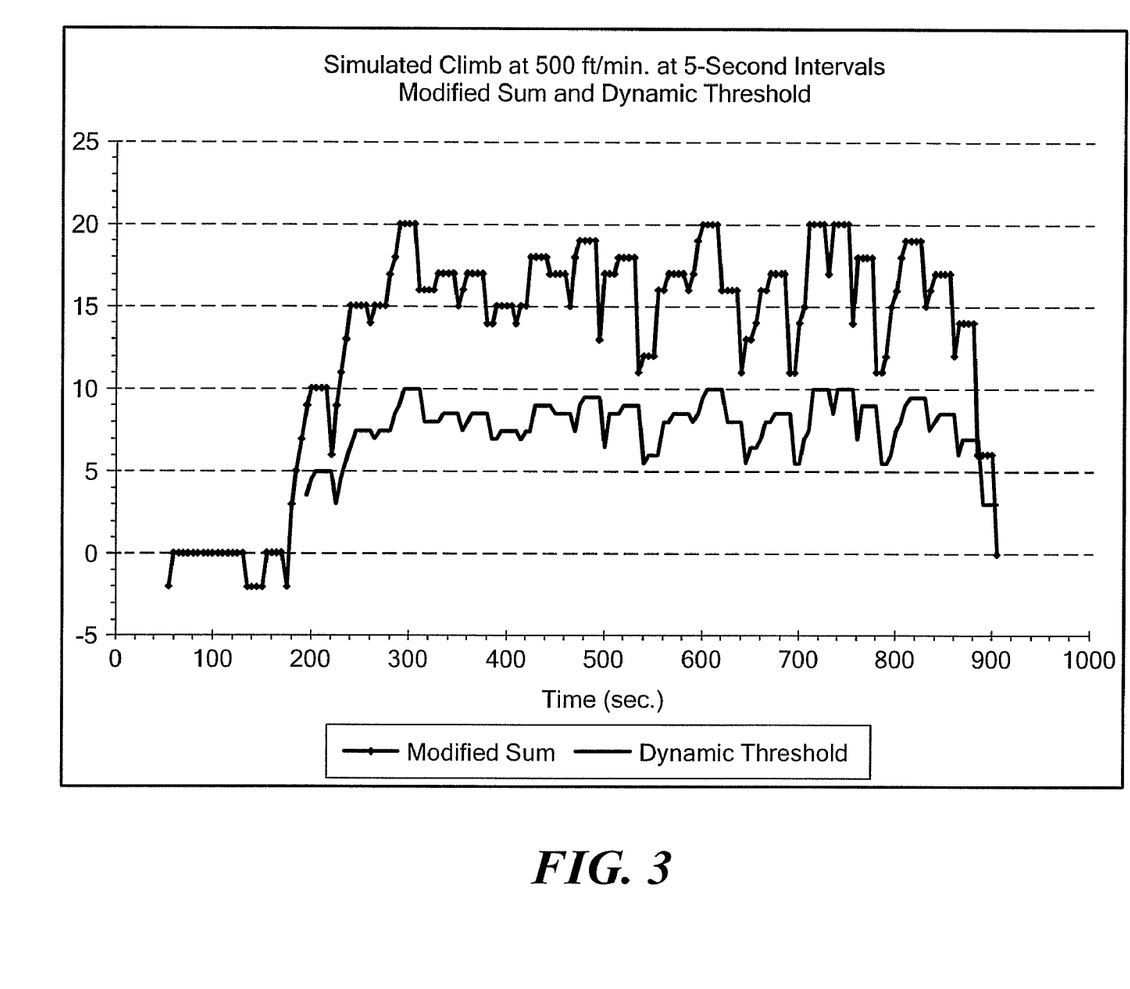
FIG. 3 is a graphical depiction of sum and threshold data over time.

Notice that although the noise component modifies the data component, the general trend of the total residual ($R_N$) still follows the trend of the data component. However, the total residual may be too volatile for this trend to be detectable in real-time. To smooth the volatility, the following exemplary scheme is used, which is shown in FIG. 3. In an exemplary embodiment, the range of the residuals is divided into seven bands and each band is assigned a weight. Residuals that fall within the same band acquire the weight of the band. The volatility is thus reduced to seven possible values, whose pattern preserves the trend of the data component, except for isolated spikes, whose weights may not follow the trend. To eliminate these spikes, in one embodiment, weights are further smoothed by means of a four-element moving sum ($S_N$). The sum is allowed to increase, but after every increase, it is frozen for three, for example, consecutive updates, replacing any subsequent decrease of the sum. This process creates a modified sum $M_N \geq S_N$, and it is used to avoid oscillations. The band-limits and weights for climbing and descending aircraft are listed below in Tables 1 and 2, respectively. The modified sums pertaining to the total residuals of FIG. 2 are depicted in FIG. 3.

TABLE 1

Band Limits for Climbing Aircraft

| Band Limits | Weight |
|---|---|
| 0.70 < R | −2 |
| −0.35 ≤ R ≤ 0.70 | 0 |
| −0.70 ≤ R < −0.35 | 1 |
| −1.05 ≤ R < −0.70 | 2 |
| −1.40 ≤ R < −1.05 | 3 |
| −1.75 ≤ R < −1.40 | 4 |
| R < −1.75 | 5 |

TABLE 2

Band Limits for Descending Aircraft

| Band Limits | Weight |
|---|---|
| R < −0.70 | −2 |
| −0.70 ≤ R ≤ 0.35 | 0 |
| 0.35 < R ≤ 0.70 | 1 |
| 0.70 < R ≤ 1.05 | 2 |
| 1.05 < R ≤ 1.40 | 3 |
| 1.40 < R ≤ 1.75 | 4 |
| 1.75 < R | 5 |

Comparing FIGS. 2 and 3 shows that smoothing significantly reduces the volatility of the residual, especially during the transition periods between level and non-level flights. But this type of smoothing does more. It limits the steady state value of the smoothed residual to 20, regardless of the aircraft's vertical speed and the sensor's sampling period, even though the actual steady state residual is proportional to both (see Mathematical Derivations and Formulas section below). The result is that an unbounded steady state level is transformed to a bounded one. This forces the smoothed residual to transition to, or from, steady state much faster when vertical speeds are higher and/or sensor data rates are slower.

Transitions to and from level flight are detected by comparing the sum to thresholds. The threshold to detect departure from level flight is set to a value of 5, for example. It is a design constant because the smoothed residual is rising from an almost constant value at or near zero, regardless of flight dynamics. However, before return to level flight the residual can be equal to any value up to 20, for example. So in order to detect a fall in value as early as possible, the threshold should closely follow the residual, but at a safe margin below it, to avoid false indications. Therefore, in an exemplary embodiment, the threshold is continuously reset, each time to half the value of the previously-calculated modified sum. For example, if the latest modified sum is $M_N$, the threshold $U_N$ is set to $M_{N-1}/2$.

FIG. 3 depicts the relation between the dynamic threshold and the modified sum (MS). Vertical motion is declared when the sum is equal to, or greater than, 5 and rising. The indication remains unchanged until $S_N$ falls to a value that is equal to, or less than, threshold $U_N$. Once the indication has been changed to level-flight, it remains so as long as the sum is falling, even if it greater than 5.

Figure 4:
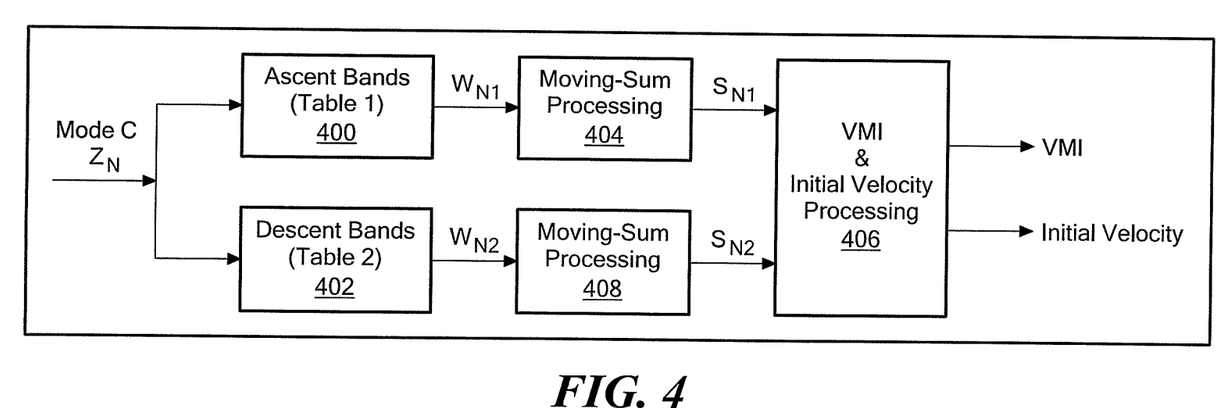
FIG. 4 is a block diagram showing a portion of vertical motion detection processing.

It is understood that before the first indication of vertical motion is detected, it may be impossible to know whether Table 1 or 2 should be used. In an exemplary embodiment, both tables will be applied in parallel to each new measurement to provide dual filter paths, as depicted in FIG. 4. An ascent band module 400 for Table 1 and a descent band module 402 for Table 2 receive Mode C altitude data $Z_N$. The ascent band module 400 provides weighted data to a moving-sum processing module 404, which outputs sum data $S_{N1}$ to a vertical motion detector and initial velocity processing module 406. The second filter path includes the descent band module 402 providing weighted data to moving sum processing module 408, which also outputs sum data to the vertical motion detector and initial velocity processing module 406.

During level flight, both filters will provide the same indication. When an aircraft departs from level flight, only one filter will produce increasing weights capable of exceeding the threshold, whereas the other will output a negative level. Since each filter is associated with a known vertical direction, the direction of the motion will automatically become known by virtue of the filter that provided the indication.

Figure 5:
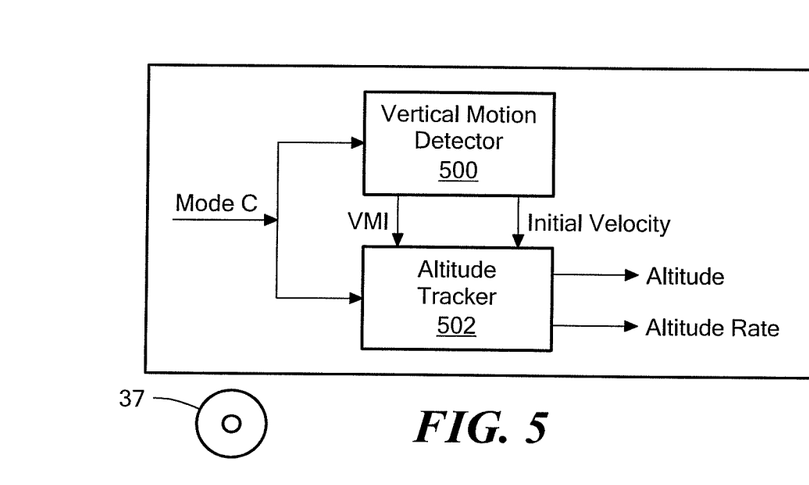
FIG. 5 is a block diagram showing a vertical motion detector and an altitude tracker.

FIG. 5 shows a vertical motion detector module 500 providing vertical motion information and initial velocity information to an altitude tracker module 502. Mode C data is provided to the vertical motion detector module 500 and the altitude tracker 502, which outputs altitude and altitude rate data. In one embodiment, the vertical motion detector module 500 and altitude tracker 502 form a part of a track processor, such as the track processor 28 of FIG. 1.

When vertical motion has been detected by the vertical motion detector module 500, a vertical motion indicator (VMI) is provided to the altitude tracker module 502 to initiate a vertical track. Tracks can be initiated by two distinct measurements and/or by one measurement and an initial velocity. The latter method is faster because one need not wait for a second measurement, and may be preferable, in view of the detection delay inherent in any vertical motion detection scheme. Although the inventive vertical motion detector may not be able to estimate velocity as accurately as an altitude tracker can, it is nonetheless able to provide a usable estimate for track initiation. The estimate is based on the assumption that the actual vertical motion has been ongoing for at least two scan periods prior to its detection, which means that at least three measurements from the vertical motion are available in the circular buffer. Applying a linear regression to these measurements produces an initial-velocity estimate, which is equal to the slope of the regression line (see Mathematical Derivations and Formulas section below). As a rule of thumb, in an exemplary embodiment, the number of points regressed should span half the look-back window, i.e. they should not exceed $k/2$.

Since the response time of the inventive vertical motion detection is finite, there may be situations where an aircraft will perform a double maneuver within the response time. This may result in brief anomalies. For example, a leveling off of short duration in the midst of a descent may result in a level-flight indication that misses the level-flight and coincides with the resumption of the descent. Such anomalies are data-rate dependent and are too short to have any significant impact on tracking and safety-function performance.

Further details of vertical motion detection are now provided. The above overview assumed that the circular buffer was filled with the data needed to calculate the k-element moving average and the four-element smoothing sum. This describes the vertical motion detection processing step by step, starting with an empty buffer. The buffer, see Table 3 below, has two rows and nine columns, with each column containing a Mode C flight-level measurement and its time stamp. The most recent flight level and time are denoted $Z_N$ and $t_N$, respectively.

TABLE 3

Circular Buffer

| | Time | | | |
|---|---|---|---|---|
| | $t_N$ | $t_{N-1}$ | $t_{N-k+1}$ | $t_{N-8}$ |
| Mode C | $Z_N$ | $Z_{N-1}$ | $Z_{N-k+1}$ | $Z_{N-8}$ |

Figure 6:
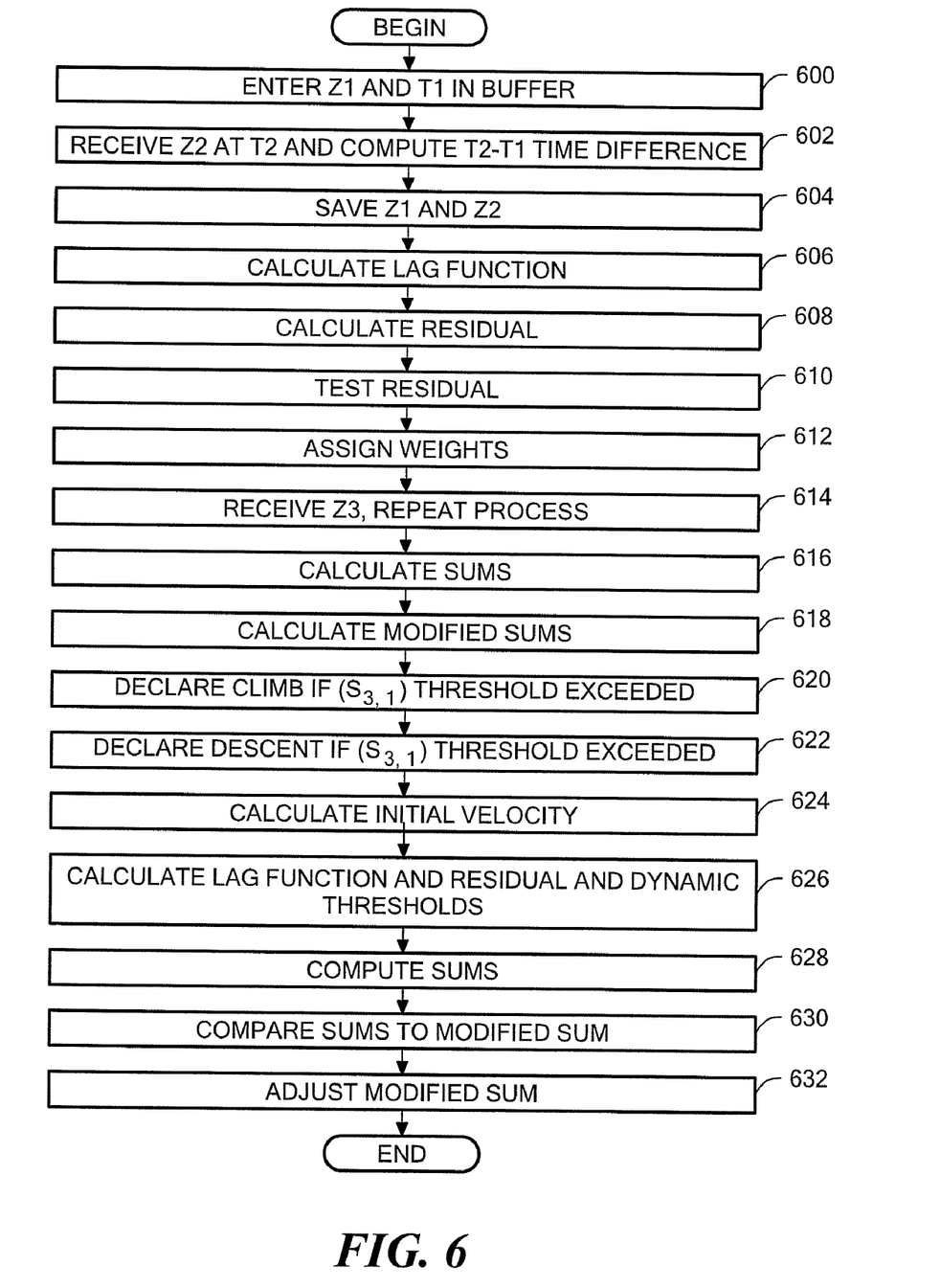
FIG. 6 is a flow diagram showing an exemplary sequence of steps for initialization.

FIG. 6 is a flow diagram showing an exemplary sequence of steps for initialization of vertical motion detection in accordance with exemplary embodiments of the invention. While exemplary parameters and numbers are used, it is understood that other embodiments can use any practical initialization process to meet the needs of a particular application.

In step 600, when a new target is detected, its measurement ($z_1$) and time stamp ($t_1$) are entered into the first column of the buffer. In step 602, when the second measurement ($z_2$) is received, at time $t_2$, the difference $\Delta t=t_2-t_1$ is calculated. At step 604, if $\Delta t \geq 2$ seconds, the first measurement is copied into the second column and the second measurement is saved in the first column. In steps 606 and 608 respectively the lag function $L(Z_2)$, per Eq. (2), and the residual $R_2=L(Z_2)-z_2$ are calculated.

In step 610, the residual $R_2$ is then tested against Tables 1 and 2 and assigned weights $w_{2,1}$ and $w_{2,2}$, respectively, in step 612, which are saved in the Moving-Sum Table, see Table 4 below. At this point, the indexes in Tables 3 and 4 correspond to N=2. The as yet undefined entries are equal to zero.

TABLE 4

Moving Sum Table (MST)

| | Weight | Weight | Weight | Weight | Sum | MS | Counter |
|---|---|---|---|---|---|---|---|
| Filter 1 | $w_{N,1}$ | $w_{N-1,1}$ | $w_{N-2,1}$ | $w_{N-3,1}$ | $S_{N,1}$ | $M_{N,1}$ | $0 \leq C_1 \leq 3$ |
| Filter 2 | $w_{N,2}$ | $w_{N-1,2}$ | $w_{N-2,2}$ | $w_{N-3,2}$ | $S_{N,2}$ | $M_{N,2}$ | $0 \leq C_2 \leq 3$ |

In step 614, when the third measurement is received, the process is repeated. If $t_3-t_2 \geq 2$ sec., the existing entries in the circular buffer are moved by one column to the right and ($t_3$, $z_3$) are entered into the first column. $L(Z_3)$ and $R_3$ are calculated and $w_{3,1}$ and $w_{3,2}$ are looked up and saved in the MST. At this point step 616 is added, which is the calculation of the sums $S_{3,1}=w_{2,1}+w_{3,1}$ and $S_{3,2}=w_{2,2}+w_{3,2}$. The modified sums, in step 618, are initialized to $M_{3,1}=S_{3,1}$ and $M_{3,2}=S_{3,2}$. The sums and modified sums are also saved in the MST and the counters are set to zero. In step 620, if $S_{3,1} \geq 5$, climb is declared (the VMI is set to NLF (climb)) and in step 622 if $S_{3,2} \geq 5$, descent is declared (the VMI is set to NLF (descent)). In either case, an initial velocity is calculated by regressing the first three measurements in step 624 (see Mathematical Derivations and Formulas section below). Otherwise, level-flight is declared (the VMI is set to LF).

With receipt of the fourth eligible measurement, the final step of the initialization phase takes place. In step 626 $L(Z_4)$, $R_4$, and the dynamic thresholds $U_{4,1}=M_{3,1}/2$ and $U_{4,2}=M_{3,2}/2$ are calculated. In step 628, $w_{4,1}$ and $w_{4,2}$ are looked up and saved in the MST, and the sums $S_{4,1}=w_{2,1}+w_{3,1}+w_{4,1}$ and $S_{4,2}=w_{2,2}+w_{3,2}+w_{4,2}$ are calculated. At this point, in step 630, $S_{4,1}$ and $S_{4,2}$ are compared to $M_{3,1}$ and $M_{3,2}$, respectively. If $S_{4,1}>M_{3,1}$, in step 632 $M_{4,1}$ is set to $S_{4,1}$ and the counter $C_1$ remains equal to zero, otherwise, $M_{4,1}=M_{3,1}$ and the counter is set to one. This concludes the fourth update cycle, at which point $S_{4,1}$, $M_{4,1}$, and $C_1$ replace the previous values in the MST. A similar calculation is done for $S_{4,2}$, $M_{4,2}$, and $C_2$. If the previous indication was for level flight and either $S_{4,1} \geq 5$ or $S_{4,2} \geq 5$, the VMI is changed to NLF (climb) or NLF (descent), respectively, and an initial velocity is calculated as described above, using the four available measurements. Otherwise, the previous indication of either LF or NLF remains unchanged.

Beginning with the fifth measurement, the following steps are repeated for each new measurement $z_N$ time-stamped at $t_N$. Note that index N always denotes the new measurement. When a new measurement is received, the indexes of all previously saved quantities are assumed to have been automatically decremented by 1. For example, N=12 means that the most recent measurement was $z_{12}$. When the next measurement, $z_{13}$, is received, N=13 and $z_{12}=z_{N-1}$.

Figure 7:
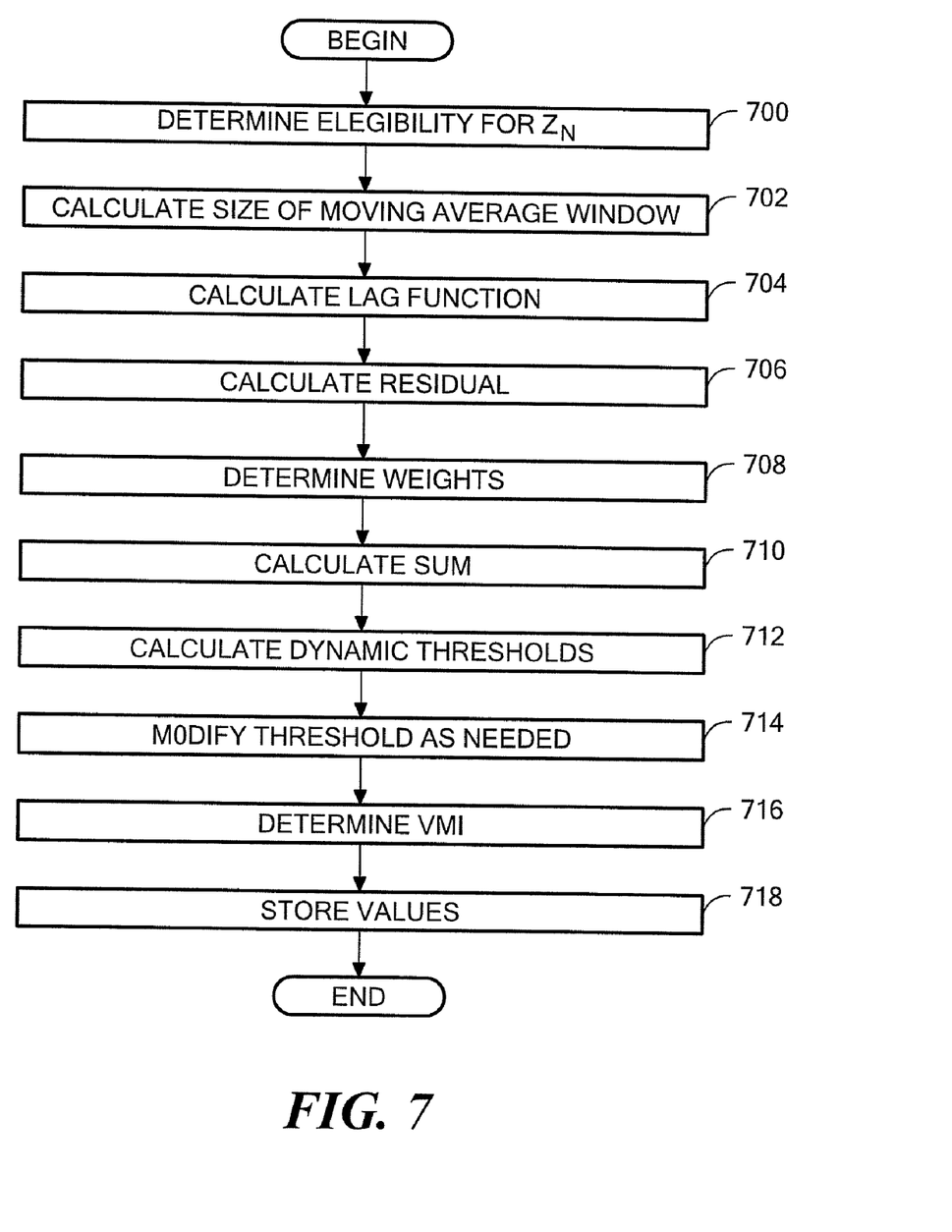
FIG. 7 is a flow diagram showing an exemplary sequence of steps for vertical motion detection.

FIG. 7 shows an exemplary sequence of steps for vertical motion detection after initialization in accordance with exemplary embodiments of the invention. In step 700, the system determines whether the current altitude measurement $z_N$ for the aircraft should be used. For example, if $t_N-t_{N-1}<2$ seconds, exit; else replace all $z_{N-m-1}$ and $t_{N-m-1}$ in the circular buffer by $z_{N-m}$ and $t_{N-m}$, respectively, where $0 \leq m \leq 8$. In step 702, the moving average window size is determined, e.g., by calculating the size of the moving-average window k, where $k=\min\{9,k_o\}$ and $k_o=\max\{m|t_N-t_{N-m+1} \leq 45 \text{ seconds}\}$. (k is the smaller of 9 or the largest value for which the difference $t_N-t_{N-k+1} \leq 45$ seconds.)

In step 704, the lag function $L(Z_k)$ is calculated per Eq. (2) and in step 706, the residual is calculated as $R_N=L(Z_k)-z_N$. In step 708, using Tables 1 and 2, the system determines the weights $w_{N,1}$ and $w_{N,2}$ and replaces in the MST all $w_{N-m-1,1}$ and $w_{N-m-1,2}$ by $w_{N-m,1}$ and $w_{N-m,2}$, respectively, where $0 \leq m \leq 3$. In step 710, the system calculates sum $S_{N,j}$ where j=1,2 and $$S_{N,j} = \sum_{m=N-3}^{N} w_{m,j}.$$

In step 712, the system retrieves modified sum values $M_{N-1,1}$ and $M_{N-1,2}$ from the MST and calculates the dynamic thresholds $U_{N,1}=M_{N-1,1}/2$ and $U_{N,2}=M_{N-1,2}/2$.

In step 714, the system updates the modified threshold based upon the sum value and checks the counter value. For example,

---

For j = 1,2 {
    If ($S_{N,j} = M_{N-1,j}$) then
        if (counter $C_j < 3$) then
            increment $C_j$ by 1
        endif
    Else if ($S_{N,j} > M_{N-1,j}$ or $C_j = 3$) then
        Set $M_{N,j}$ to $S_{N,j}$ and reset the counter $C_j$ to zero
    Else
        increment $C_j$ by 1
    Endif
}

---

In step 716, the vertical motion indicator (VMI) value is updated. For example,

---

If (VMI = LF) then
    if ($S_{N,1} \geq 5$ and $S_{N,1} > S_{N-1,1}$) then
        Estimate the aircraft's velocity ($v_z$) by linear regression of the
        last $k_r$ data points,
            where $k_r$ is equal to the integer part of k/2, if k >4;
            otherwise, calculate $6000 \cdot (z_N - z_{N-1})/(t_N - t_{N-1})$ ft/min.
        set the VMI to NLF(climb)
    else if ($S_{N,2} \geq 5$ and $S_{N,2} > S_{N-1,2}$) then
        Estimate the aircraft's velocity ($v_z$) by linear regression of the
        last $k_r$ data points,
            where $k_r$ is equal to the integer part of k/2, if k >4;
            otherwise, calculate $6000 \cdot (z_N - z_{N-1})/(t_N - t_{N-1})$ ft/min.
        set the VMI to NLF(descent)
    endif
Else
    if (VMI = NLF(climb) and $S_{N,1} \leq U_{N,1}$) then
        set the VMI to LF
    else if (VMI = NLF(descent) and $S_{N,2} \leq U_{N,2}$) then
        set the VMI to LF
    endif
Endif

---

In step 718, the system stores the computed values, e.g., $S_{N,1}$, $S_{N,2}$, $M_{N,1}$, $M_{N,2}$, $C_1$, and $C_2$ in the MST.

In an exemplary embodiment, the inventive vertical motion detector is integrated with an altitude tracker, such as a one-dimensional altitude tracker of the Interacting Multiple Model (IMM) type, for example, that will operate independently of the Multi-Radar Tracker and use a measurement noise model that more closely models quantization noise. The vertical motion indicator can be used in conjunction with the IMM's model probabilities to determine the weights used in calculating the state vector output. It is understood that other embodiments can include inventive vertical motion detection in conjunction with any suitable tracker.

Figure 8:
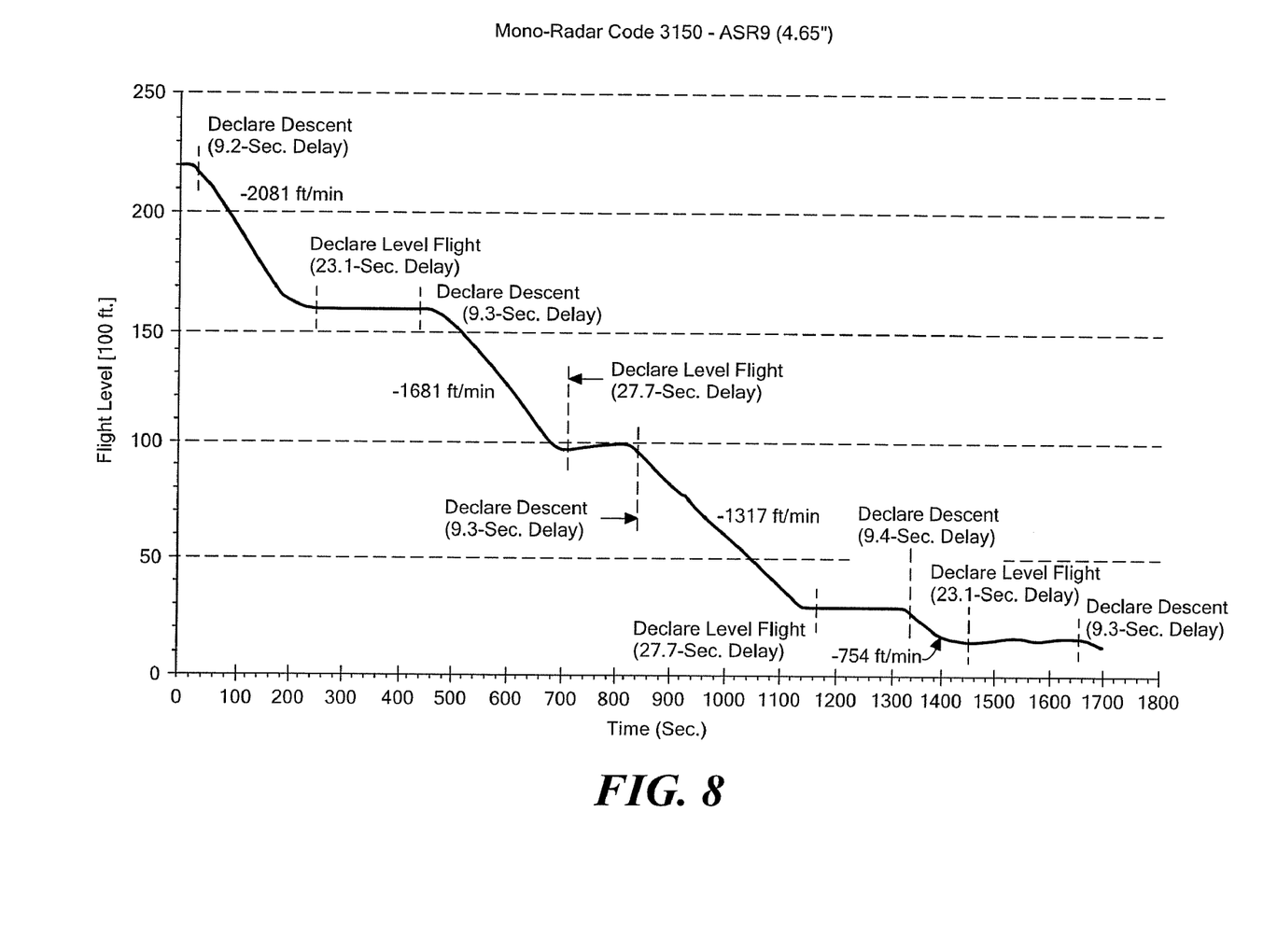
FIG. 8 is a graphical representation of an altitude profile of a descending SSR Code 3150.

Inventive vertical motion detection embodiments were successfully tested with live data and simulated data. FIG. 8 shows the live-data altitude profile of SSR code 3150, which descended from 22,000 feet to 1200 feet in multiple intervals of decreasing descent rates, separated by periods of level flight. The speeds shown next to each segment were estimated by linear regression of the points comprising the segment. For short range radars listed in Table 5 below, the live-data test results are summarized in Table 6. The table lists the detection delay of each transition in seconds and, next to it in parenthesis, in scans. The estimated velocity by linear regression is compared with the initial velocity provided by the VMD2 and an initial velocity calculated from the first difference of the first two consecutive NLF measurements. The percent error refers to the magnitude of the difference between the two velocities relative to the estimated velocity. No false-indication anomalies were detected.

TABLE 5

Atlantic City Short Range Radars

| Designation | Radar Type | Scan Period [Sec] |
|---|---|---|
| ACY | ASR9 Mode S | 4.62 |
| PHL | ASR9 Mode S | 4.61 |
| NXY | ASR11 | 4.95 |

TABLE 6

Mono-Radar (SRR) Live Data Test Results

| Segment | Type | Detection Delay [sec (scans)] | Estimated NLF Velocity [ft/min] | VMD2 Initial NLF Velocity [ft/min] | Percent Error | Tracker Initial NLF Velocity [ft/min] | Percent Error |
|---|---|---|---|---|---|---|---|
| 1 | NLF | 9.2 (2) | −2081 | −786 | 62.2 | −1292 | 37.9 |
| 2 | LF | 23.1 (5) | — | — | — | — | — |
| 3 | NLF | 9.3 (2) | −1681 | −387 | 77.0 | −1332 | 20.8 |
| 4 | LF | 27.7 (6) | — | — | — | — | — |
| 5 | NLF | 9.3 (2) | −1317 | −774 | 41.2 | −1332 | 1.1 |
| 6 | LF | 27.7 (6) | — | — | — | — | — |
| 7 | NLF | 9.4 (2) | −754 | −774 | 2.6 | −1333 | 76.7 |
| 8 | LF | 23.1 (5) | — | — | — | — | — |
| 9 | NLF | 9.3 (2) | −649 | −388 | 40.2 | 0 | 100.0 |

Mathematical Derivations and Formulas

The below shows the derivation of the lag function and data component of the residual for either short-range or long-range mono-radar data. The vertical motion is either a climb (positive velocity) or a descent (negative velocity), sandwiched between two legs of level flight. Formulas are derived for the five flight segments that comprise the scenario: (a) initial cruising period, during which the residual is equal to zero, (b) early vertical motion, during which the residual increases from zero to a steady state value, (c) vertical motion, during which the residual is equal to a constant steady state value, (d) early level flight, during which the residual decreases from its steady state value to zero, and (e) final cruising period, during which the residual is again equal to zero.

Notation $t_n$=time; n=integer $t_N$=time of the most recent datum $\Delta t = t_n - t_{n-1}$=mono-radar scan period $z_n$=altitude at time $t_n$ $\{z_n | N-(k-1) \leq n \leq N\}$=A set of k elements that are averaged at time $t_N$. (k would be equal to 9 for short-range radar data and equal to 4 for long-range radar data, for example.)

$v_z$=vertical velocity $A_1$=initial cruising altitude $A_2$=final cruising altitude k-Point Lag Function and Residual Let $t_N$ be the current time, $t_p$ the time at which the vertical motion begins, and $t_q$ the time at which the vertical motion ends.

During the initial cruising phase, $N \leq p$, $z_{N-j}=A_1$, j=0, 1, ..., (k−1). The lag function is, $$L(Z_k) = \frac{1}{k}\sum_{j=0}^{k-1} z_{N-j} = A_1$$

and the residual is $r_N = L(Z_k) - z_N = A_1 - A_1 = 0$.

During the final cruising phase, $N \geq q+(k-1)$, $z_{N-j}=A_2$, j=0, 1, ..., (k−1). The lag function is, $$L(Z_k) = \frac{1}{k}\sum_{j=0}^{k-1} z_{N-j} = A_2$$

and the residual is $r_N = L(Z_k) - z_N = A_2 - A_2 = 0$.

During the vertical motion's residual steady state, $p+(k-1) \leq n \leq q$, $z_n = A_1 + (n-p)v_z\Delta t$ or $z_n = A_2 - (q-n)v_z\Delta t$, $z_{N-j} = z_N - jv_z\Delta t$, j=0, 1, ..., (k−1). The lag function at time $t_N$ is, $$L(Z_k) = \frac{1}{k}\sum_{j=0}^{k-1} z_{N-j}$$

$$= A_1 + (N-p)v_z\Delta t - \frac{v_z\Delta t}{k}\sum_{j=1}^{k-1} j$$

$$= z_N - \frac{k-1}{2}v_z\Delta t$$

The steady state residual is $$r_N = L(Z_k) - z_N = -\frac{k-1}{2}v_z\Delta t.$$

During the transition from cruising to steady state, $p \leq N \leq p+(k-1)$, and the average includes $k-(N-p)$ elements of constant value $A_1$ and (N−p) elements $z_N = A_1 + jv_z\Delta t$, where j=1, 2, ..., (N−p). The lag function is, $$L(Z_k) = \frac{1}{k}\sum_{j=0}^{k-1} z_{N-j}$$

$$= A_1 + \frac{v_z\Delta t}{k}\sum_{j=1}^{N-p} j$$

$$= A_1 + \frac{v_z\Delta t}{k}\frac{(N-p)(N-p+1)}{2}$$

and the residual, $L(Z_k) - z_N$, is, $$r_N = -\frac{1}{k}\left[k(N-p) - \frac{(N-p)(N-p+1)}{2}\right]v_z\Delta t$$

$$= -\frac{1}{k}\left[\frac{(N-p)(2k-1-(N-p))}{2}\right]v_z\Delta t.$$

Note that at the limits of the interval, when N=p, $r_N$=0, which is equal to the cruising residual, and when N=p+(k−1), $$r_N = -\frac{k-1}{2} v_z \Delta t,$$

which is equal to the steady state residual.

During the transition from steady state to cruising, $q \leq N \leq q+(k-1)$, and the average includes k−(N−q) elements $z_N = A_2 - j v_z \Delta t$, where j=1, 2, . . . , (N−q), and (N−q) elements of constant value $A_2$. The lag function is, $$L(Z_k) = \frac{1}{k} \sum_{j=0}^{k-1} z_{N-j}$$

$$= A_2 - \frac{v_z \Delta t}{k} \sum_{j=1}^{(k-1)-(N-q)} j$$

$$= A_2 - \frac{v_z \Delta t}{k} \frac{[k-1-(N-q)][k-(N-q)]}{2}$$

and the residual is, $$r_N = L(Z_k) - z_N$$

$$= -\frac{[k-1-(N-q)][k-(N-q)]}{2k} v_z \Delta t$$

At the limits, when N=q, $$r_N = -\frac{k-1}{2} v_z \Delta t,$$

which is equal to the steady state residual, and when N=q+8, $r_N$=0, which is equal to the cruising residual.

Note that the steady state residual is proportional to the size of the look-back window, the vertical velocity, and the period of the data.

Initial Velocity

The initial velocity is the slope of a linear regression line of k data points $(t_j, z_j)$, where j=N−(k−N), . . . , N.

Notation $t_n$=time; n=integer
$t_N$=time of the most recent datum
$z_n$=altitude at time $t_n$
$\{z_n | N-(k-1) \leq n \leq N\}$=A set of k data points that are regressed. (k would be equal to 4 if the vertical motion is preceded by level flight and equal to 3 otherwise.)
$v_z$=vertical velocity
$\bar{z}$=average of the set $\{z_n | N-(k-1) \leq n \leq N\}$
$\bar{t}$=average of the set $\{t_n | N-(k-1) \leq n \leq N\}$ Formulas $$\bar{z} = \frac{1}{k} \sum_{j=N-(k-1)}^{N} z_j$$

$$\bar{t} = \frac{1}{k} \sum_{j=N-(k-1)}^{N} t_j$$

$$v_z = \frac{\sum_{j=N-(k-1)}^{N} t_j z_j - k \bar{z} \bar{t}}{\sum_{j=N-(k-1)}^{N} t_j^2 - k (\bar{t})^2}$$

If $z_n$ is given in flight levels [FL]=[100 ft] and $t_n$ in seconds, then $v_z$[ft/min]=6000$v_z$[FL/sec] and $v_z$[nmi/sec]= 0.01645788337$v_z$[FL/sec].

It is understood that the exemplary processing described herein is described in flow diagrams showing vertical motion detection. The processing blocks can represent computer software instructions or groups of instructions written in any suitable language in a manner well known to one of ordinary skill in the art. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. In addition, in exemplary embodiments computer readable instructions can be stored on a disk, such as disk 37 in FIG. 5, to enable a machine to perform the processing steps.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
receiving altitude data for an object;
determining a residual of a lag function, wherein the lag function comprises a moving average of the altitude data for the object, and wherein the residual corresponds to a difference between a value for the lag function and the object altitude data at a given time such that the residual grows in magnitude over time in response to the object transitioning from level flight to vertical motion;
limiting to a selected amount of time the altitude data used by the lag function;
detecting vertical motion of the object by comparing a sum of data derived from the residuals against a threshold value; and
outputting a vertical motion indicator after detecting the vertical motion of the object.

2. The method according to claim 1, further including initiating a track of the object in response to the vertical motion indicator.

3. The method according to claim 1, further including modifying the threshold in response to a change in the sum of the data derived from the residuals.

4. The method according to claim 1, further including weighting the residuals to generate the data derived from the residuals.

5. The method according to claim 4, further including smoothing the weighted residuals to generate the data derived from the residuals.

6. The method according to claim 5, further including smoothing the weighted residuals using a moving sum.

7. The method according to claim 1, further including computing a modified sum by freezing the sum after an increase.

8. The method according to claim 1, further including processing the altitude data in an ascent path and a descent path in parallel.

9. The method according to claim 1, further including comparing a sum of values from the weighted bands and a threshold value to determine vertical motion.

10. The method according to claim 1, wherein the residual increases positively for descent vertical motion.

11. The method according to claim 1, wherein the residual decreases in response to the object transitioning to level flight.

12. The method according to claim 1, further including dividing a range for a value of the residual into a number of bands, and assigning weights to the bands.

13. The method according to claim 1, wherein the altitude information includes Mode C data.

14. The method according to claim 1, wherein the altitude data are separated by a selected amount of time.

15. The method according to claim 1, wherein a change in the direction of vertical motion is detected independently of the vertical motion direction prior to the change in direction.

16. The method according to claim 1, wherein a steady state value of the residual is proportional to a vertical velocity of the object and to a sampling period of the altitude data.

17. A radar system, comprising:
a radar data processor comprising a track processor including a vertical motion detector module to receive altitude data for an object, determine a residual of a lag function, wherein the lag function comprises a moving average of the altitude data for the object, and wherein the residual corresponds to a difference between a value for the lag function and the object altitude data at a given time such that the residual grows in magnitude over time in response to the object transitioning from level flight to vertical motion, detect vertical motion of the object by comparing a sum of data derived from the residuals against a threshold value, and output a vertical motion indicator after detecting the vertical motion of the object, wherein the vertical motion detector module is configured to limit to a selected amount of time the altitude data used by the lag function.

18. The system according to claim 17, wherein the residual increases positively for descent vertical motion.

19. The system according to claim 17, wherein the vertical motion detector module is configured to modify the threshold in response to a change in the sum of the data derived from the residuals.

20. An article, comprising:
a computer readable medium having stored non-transitory instructions that enable a machine to perform the steps of:
receiving altitude data for an object;
determining a residual of a lag function, wherein the lag function comprises a moving average of the altitude data for the object, and wherein the residual corresponds to a difference between a value for the lag function and the object altitude data at a given time such that the residual grows in magnitude over time in response to the object transitioning from level flight to vertical motion;
limiting to a selected amount of time the altitude data used by the lag function;
detecting vertical motion of the object by comparing a sum of data derived from the residuals against a threshold value; and
outputting a vertical motion indicator after detecting the vertical motion of the object.

21. The article according to claim 20, further including instructions for modifying the threshold in response to a change in the sum of the data derived from the residuals.

* * * * *